United States Patent
Tung et al.

(10) Patent No.: US 8,121,970 B1
(45) Date of Patent: Feb. 21, 2012

(54) METHOD FOR IDENTIFYING PRIMARY PRODUCT OBJECTS

(75) Inventors: Michael Tung, Mountain View, CA (US); Shashikant Khandelwal, Mountain View, CA (US); Gurpreet Singh Sachdev, Mountain View, CA (US); Madhur Khandelwal, Mountain View, CA (US)

(73) Assignee: The Find Inc., Mountain View, CA (US)

( * ) Notice: Subject to any disclaimer, the term of this patent is extended or adjusted under 35 U.S.C. 154(b) by 530 days.

(21) Appl. No.: 12/454,770

(22) Filed: May 22, 2009

Related U.S. Application Data

(63) Continuation-in-part of application No. 11/287,952, filed on Nov. 28, 2005, now Pat. No. 7,693,804.

(51) Int. Cl.
*G06N 5/00* (2006.01)
(52) U.S. Cl. .......................................... 706/47; 706/45
(58) Field of Classification Search .................. 706/47, 706/45
See application file for complete search history.

(56) References Cited

U.S. PATENT DOCUMENTS

| | | |
|---|---|---|
| 2002/0103786 A1 | 8/2002 | Goel |
| 2002/0103797 A1 | 8/2002 | Goel et al. |
| 2002/0174120 A1 | 11/2002 | Zhang et al. |
| 2003/0028512 A1 | 2/2003 | Stensmo |
| 2003/0088562 A1 | 5/2003 | Dillon et al. |
| 2005/0210008 A1 | 9/2005 | Tran |

OTHER PUBLICATIONS

Zhu, Feature Extraction and Dimension Reduction with Applications to Classification and the Analysis of Co-occurrence Data, Doctoral Thesis, Stanford University, Jun. 2001, pp. 1-150.*

* cited by examiner

*Primary Examiner* — Wilbert L Starks
(74) *Attorney, Agent, or Firm* — William L. Botjer

(57) ABSTRACT

A method for identifying primary product objects on webpages over the Internet. A primary product object displays the best view of the product that a webpage is detailing. Each webpage is divided into sections based on the primary product objects in the webpage. Features of candidate product objects in each section are extracted. The primary product objects are identified by computing probabilities of the candidate product objects in each section being primary product objects, based on a statistical model. The identified primary product objects are stored for subsequent retrieval and display.

24 Claims, 9 Drawing Sheets

METHOD FOR IDENTIFYING PRIMARY PRODUCT OBJECTS

CROSS REFERENCE TO RELATED APPLICATIONS

This application is a continuation-in-part of the U.S. patent application Ser. No. 11/287,952 filed on Nov. 28, 2005 now U.S. Pat. No. 7,693,804 and titled "Method, system and computer program product for identifying primary product objects" which is incorporated by reference herein.

BACKGROUND

This invention relates to search algorithms on the Internet. More specifically, the invention relates to a method for extracting product related information from different websites for facilitating online shopping.

The Internet has enabled online shopping. Online shopping has made the process of shopping time efficient and convenient as compared to conventional shopping. Different search algorithms on the Internet have enabled people to find the desired products easily from the multitude of products available. Conventional search algorithms use keyword based searches to find webpages relating to products. These algorithms generally index all keywords on a webpage and are not based on product-related information. In addition, the search algorithms do not differentiate clearly between which part of the webpage has information about the product and which part does not. However, product-related information such as product image, product title and product price determine purchase to a great extent. These parameters are not taken into consideration while indexing the webpages. In order to include these product related parameters, this information needs to be extracted from each webpage available on the Internet. Typically this is done manually or using semi-automatic information extraction techniques such as Wrapper Induction. However, this becomes time consuming and inefficient because there are millions of webpages and have different formats. Further, the conventional search algorithms do not take into account attributes of product-related information on a webpage, which includes attributes of product image, product title and the like. As a result, the search may yield results that are not relevant.

In light of the aforementioned shortcomings, there is a need for an information extraction method which enables automatic extraction of product related information from millions of webpages on the Internet accurately and efficiently. Accordingly the search algorithm takes into account the attributes of product-related information on webpages and provides results with high accuracy.

SUMMARY OF THE INVENTION

An object of the present invention is to identify multiple primary product objects in a webpage over the Internet.

Another object of the present invention is to provide a highly accurate search algorithm for finding product-related information.

Yet another object of the present invention is to optimize resource utilization for identifying the multiple primary product objects.

Still another object of the present invention is to make online shopping more time-efficient and convenient.

In accordance with the aforementioned objects, an embodiment of the present invention provides a method for identifying a plurality of primary product objects that are present on webpages over the Internet. The identification of the primary product objects on each webpage makes the process of online shopping accurate and efficient. In this method, webpages over the Internet are crawled using a crawler and primary product objects are identified on each webpage. In various embodiments of the invention, multiple primary product objects on a webpage can be identified. Primary product objects on each webpage are identified by dividing each webpage into sections such that each section has candidate product objects which potentially can be primary product objects extracting all the objects such as images and titles on each section of the webpage, extracting a set of features such as geometric features, alternative text (ALT) features, Link text features, proximity of the objects to a predefined set of elements on each section of the webpage, and computing the probability of each object being a primary product object based on the set of features. The probability indicates a likelihood of the one or more candidate product objects being the one or more primary product objects. The identified primary product object on each webpage is tagged and stored. Herein, the division of each webpage is based on, for example, features of the objects and relative positions of the objects on the webpage.

The primary product identification process is performed offline and is independent of a user query. After extracting the primary product objects from multiple webpages, the objects are indexed and stored in an appropriate format. Upon a user query, the indexed or tagged primary product objects are used to provide relevant results to the user.

In an embodiment of the present invention, for identifying primary product objects in webpages, similar webpages are clustered to form one set. Herein, similar webpages refer to webpages having similar structure and features. Further, these webpages are webpages of a company's or merchant's website. In an example, the hierarchical structure and meta information of webpages is used to cluster the webpages. The method as described above is executed on a few exemplary webpages of the cluster and accordingly a rule is created based on the analysis of the exemplary webpages. This rule is then executed on the remaining webpages in the cluster. This facilitates optimal usage of the computational resources. Usually, the generic search algorithms are computationally very heavy. Accordingly, the execution of rules results in optimal utilization of the computational resources.

By identifying the one or more primary product objects in the one or more webpages in the Internet, online shopping is made more convenient and time-efficient. Further, merchant websites are benefited by higher sales as the one or more primary product objects determine purchase to a great extent. Moreover, a faster way of finding product-related information on the Internet is enabled. In addition, resource and time optimization are achieved.

BRIEF DESCRIPTION OF THE DRAWINGS

The various embodiments of the invention will hereinafter be described in conjunction with the appended drawings provided to illustrate and not to limit the invention, wherein like designations denote like elements, and in which.

DESCRIPTION OF PREFERRED EMBODIMENTS

Various embodiments of the invention provide a method for identifying primary multiple candidate product objects in one or more webpages over the Internet. Candidate product objects on a webpage of the one or more webpages may be defined as an element of the webpage, such as an image, a title, an applet and the like. Primary product objects show the best view/representation of a product that is detailed on the webpage. Herein, primary product objects are identified based on a set of features for each candidate product objects and then computing a probability for each candidate product object being a primary product object. The identified primary product objects on each webpage are stored and are used for enabling online shopping search for a product.

Figure 1:
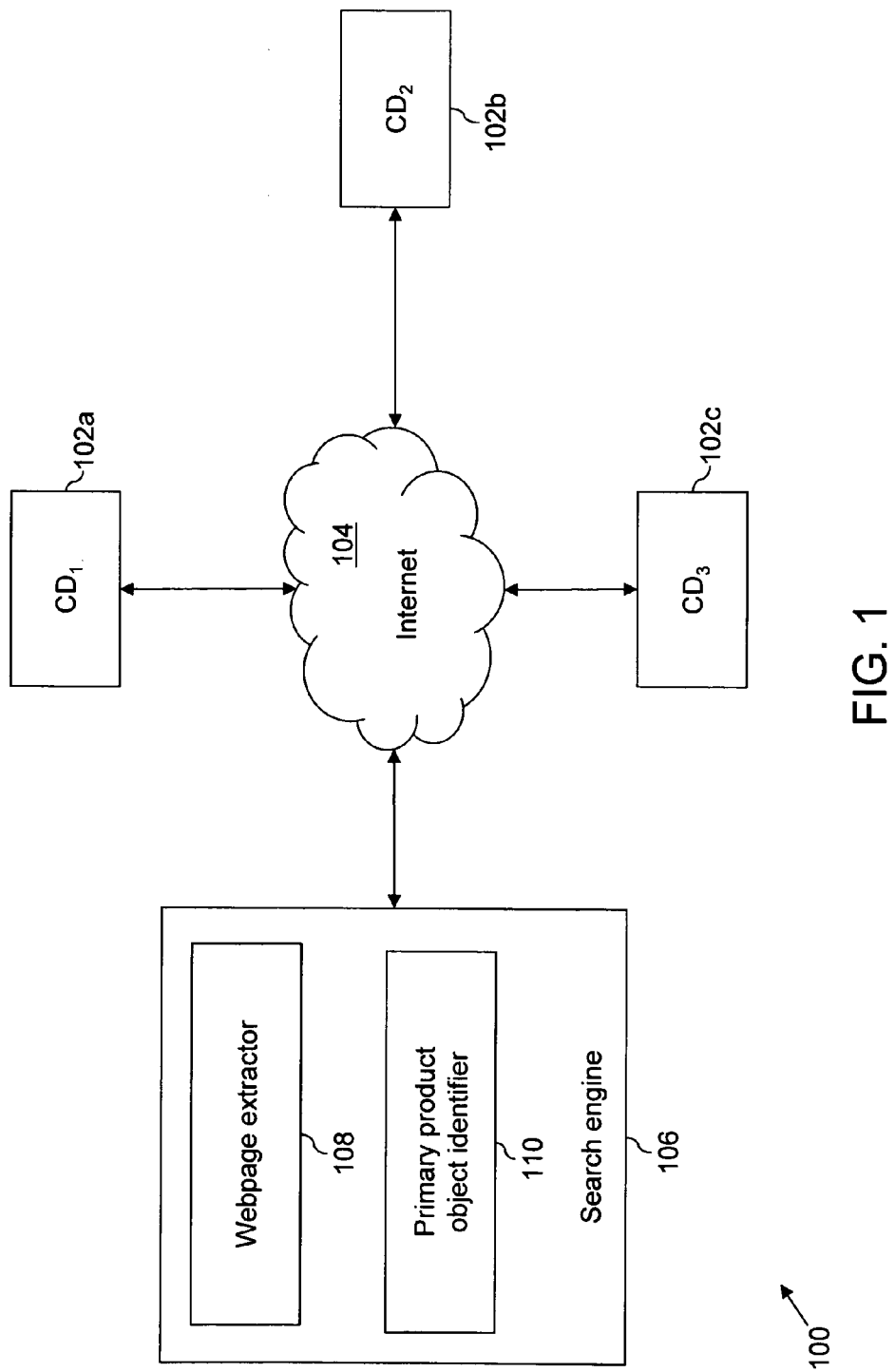
FIG. 1 is a block diagram illustrating an environment for practicing various embodiments of the present invention.

FIG. 1 is a block diagram illustrating an environment 100 for practicing various embodiments of the present invention. The environment 100 includes one or more computational devices 102 such as $CD_1$ 102a, $CD_2$ 102b and $CD_3$ 102c connected to the Internet 104. Each computational device 102 includes at least one input device, output device, memory and a processor. The computational devices 102 process data according to a set of instructions. In various embodiments of the present invention, the computational device 102 may be a personal computer, a portable computer, a mobile phone, a personal digital assistant, and the like. The Internet 104 is an interconnection of computer networks, and includes a search engine 106. According to an embodiment of the present invention, the search engine 106 has webpage extractor 108 which crawls all the webpages available over the Internet 104. Accordingly, webpages are not extracted in real time. The crawled webpages are analyzed and required information is stored. This is further explained in subsequent paragraphs.

The search engine 106 also includes a primary product object identifier 110. Each of the one or more webpages includes one or more candidate product objects. The objects that are related to consumer products are referred to as candidate product objects. The primary product object identifier 110 identifies primary product objects from the one or more candidate product objects included in the one or more webpages over the Internet 104. The functionality of the primary product identifier 110 is explained in detail in FIG. 2.

In various embodiments of the invention, system elements such as webpage extractor 108 and primary product object identifier 110 may be implemented as hardware modules, software modules, firmware, or a combination thereof.

Figure 2:
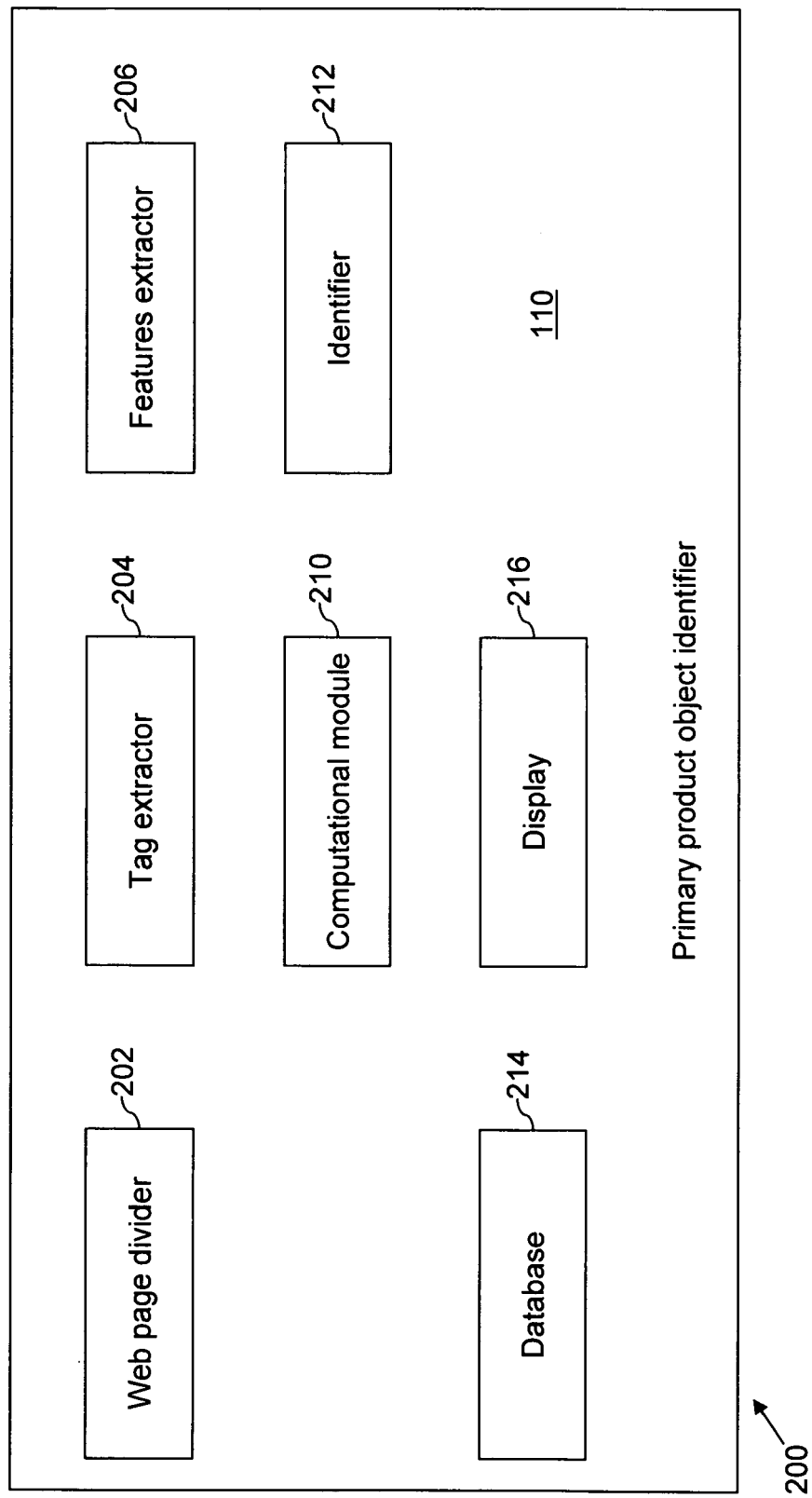
FIG. 2 is a block diagram illustrating a primary product object identifier, in accordance with an embodiment of the present invention.

FIG. 2 is a block diagram 200 illustrating the primary product object identifier 110, in accordance with an embodiment of the present invention. The primary product object identifier 110 includes a webpage divider 202, a tag extractor 204, a features extractor 206, a computational module 210, an identifier 212, and a database 214.

In online shopping, merchants or companies host information related to products via different webpages. Usually, information related to a product and/or products on a webpage is in the form of objects such as images, titles, price tags, and the like. These objects are referred to as candidate product objects. In this application, webpage extractor 108 extracts or crawls all the webpages over the Internet 104. These crawled webpages are analyzed by the webpage divider 202 to check if a webpage has multiple primary product objects. In an embodiment of the invention, webpage divider 202 renders the webpage and compares the relative dimensional positions of candidate product objects to determine if a subset of the candidate product objects occur in grid layout. Thereafter, features such as by way of example only, style attributes of the candidate product objects are analyzed to determine existence of multiple primary product objects on the webpage. Webpage divider 202 accordingly divides the webpage into multiple sections such that each section has one or more candidate product objects and at least one object in each section is a primary product object.

Accordingly, for each section or a webpage, features extractor 206 extracts a set of features of the candidate product objects in each section or the webpage. The set of features include style attribute features, ALT text features (The ALT attribute is used to define an "alternate text" for an image on the webpage. The value of the alt attribute is an author-defined text), link text features, proximity features, aspect ratio features, geometric features, file and hosting features, or a combination thereof. Computational module 210 computes the probability of each object being the primary product object based on the set of features extracted. The probability indicates the likelihood of an object being the primary product object. The computational module 210 uses a statistical model to compute the probabilities. In an embodiment of the invention, the statistical model is constructed by using experimental data. The identifier 212 identifies primary product objects from the candidate product objects in each section of each webpage. The database 214 stores the identified primary product objects for each section of each webpage.

Herein, the webpage divider 202 compares the height and width of image objects in a section of the webpage or the webpage. In an example, at least two primary product objects are present in the webpage when the height and width of at least two image objects included in the webpage match. In another example, the webpage divider 202 may compare the style attribute features of image objects in the webpage with other image objects in the webpage. Similarly, a title object of the one or more candidate product objects in the webpage may also be compared with other title objects in the webpage. At least two primary product objects are present in the webpage when the style attribute features of at least two image objects, or two title objects included in the webpage match. In another embodiment of the invention, to determine presence of multiple candidate product objects in the webpage, the webpage divider 202 compares alternative (ALT) text features of the image objects in the webpage with ALT text features of other image objects in the webpage. At least two primary product objects are present in the webpage when the ALT text features of at least two image objects included in the webpage match. This also helps in determining title objects related to the image objects in each section of the webpage. In another embodiment of the invention, to determine the presence of multiple candidate product objects, the webpage divider 202 compares keywords related to an image object in the webpage with keyword related to other image objects in the webpage. The keywords may relate to product categories such as shoes, product brand names, and the like. At least two primary product objects are present in the webpage when the keywords related to at least two image objects included in the webpage match. The aforementioned embodiment can also be applied to the title objects in the webpage. In another embodiment of the invention, the webpage divider 202 compares the URL of the image objects with each other. If the URLs of at least two image objects are similar then it indicates the presence of multiple primary product objects on the webpage.

In accordance with various embodiments of the invention, the analysis of the set of features is performed to compute the probabilities. Herein, the style attribute features correspond to a styling language corresponding to the candidate product objects in each section of each webpage. The ALT text features may include length of ALT text associated with the candidate product objects in the sections of the webpages. The ALT text features may also include normalized edit distance between the ALT text and webpage title element, ALT tokens and term frequency of certain words in the ALT text and the like. The ALT text of an image object may also be present as text in the webpage.

The link text features refer to an anchor text on other webpages which links to the webpage under consideration. Extraction of link text features includes comparing link text of the webpage with ALT text of candidate product objects on the webpage. If the link text of the webpage matches the ALT text of the product object in this webpage, that product object is placed at a higher ranking in the list of identified primary product objects on this webpage. In the aforementioned case, the candidate product objects can be either of title objects or image objects.

In various embodiments of the invention, the link text features further includes stoplink text. The stoplink text links to webpages that do not include candidate product objects. Examples of the stoplink text are link texts like 'Contact Us', "About Us", "Store Locator". The 'Contact Us' link text links to a webpage, of the one or more webpages, having no candidate product objects. Stoplink text may be identified by preparing a predetermined list of link texts. Thereafter, link text of non-primary product objects in the one or more webpages are analyzed. The link texts in the predetermined list that do not match the analyzed link texts are categorized as stoplink text. Accordingly, if the ALT text of candidate product objects exists in the stoplink text then candidate product objects is placed at a lower ranking in the list of identified primary product objects on the webpage.

The proximity features include estimating distance between the candidate product objects and one or more elements of the webpages. Herein, difference in location of the candidate product objects and elements of the webpages is estimated. The elements of the webpage include objects such as a zoom button, a color swatch and an 'add to cart' button. Typically, the candidate product objects that are in close proximity to the elements of the webpage have a higher probability of being primary product objects. In accordance with an embodiment of the invention, proximity of a product object to the left top corner of the webpage rendered in a two dimensional view also indicates a higher probability of the product object being a primary product object. In another embodiment of the invention, the proximity features also include proximity between image objects and title objects. Depending on this the probability of a product object being a primary product object is computed.

The aspect ratio features refer to image objects in each section of each webpage or a webpage. The aspect ratio determines a ratio of width and height of the image object. In an embodiment of the present invention, the aspect ratio features may be calculated by determining a ratio of width tags and height tags of the image objects. In another embodiment of the present invention, the aspect ratio features may be calculated by processing the image objects to extract size and aspect ratio of the image objects.

In accordance with an embodiment of the present invention, the geometric features are defined in terms of hierarchical Document Object Model of a webpage. A position of the one or more objects in the webpage is estimated as a depth from a root of the Document Object Model representation of the webpage. In accordance with another embodiment of the present invention, the geometric features can be defined in terms of two-dimensional rendering of a webpage of the one or more webpages. The webpage can be rendered by layout engines such as a Gecko® engine. The geometric features further include, but are not limited to height, width, area, width percentage, height percentage and ordinality of the image objects in each section of each webpage. For the title objects in each section of each webpage, the geometric features include, but are not limited to alignment, border, heading style, font type and font size. The file and hosting features include hosts of the candidate product objects in each section of each webpage. The hosts include, but are not limited to Adhost and the host of the webpage.

The tag extractor 204 extracts product object tags from each section of each of the one or more webpages. In an embodiment of the present invention, the tag extractor 204 extracts Hypertext Markup Language (HTML) tags from each section of each webpage. Extraction of the tags is essential for rendering of the extracted webpages in web browsers of computational devices 102.

In accordance with an embodiment of the invention, the statistical model may be one of a Bayesian network, a Linear model, a Naïve Bayes model, a J48 decision tree, a k-Nearest neighbors model and a Support vector machine and the like.

In various embodiments of the invention, system elements such as webpage divider 202, tag extractor 204, features extractor 206, computational module 210, identifier 212, and database 214 may be implemented as hardware modules, software modules, firmware, or a combination thereof.

In various embodiments of the invention, webpages that are similar in structures and features are clustered and then analyzed to identify the primary product objects on the webpages in a cluster. Herein, a few exemplary webpages in each cluster are analyzed as described above and the rest of the webpages are analyzed based on the analysis of the exemplary webpages. This is explained in detail in conjunction with FIG. 3.

Figure 3:
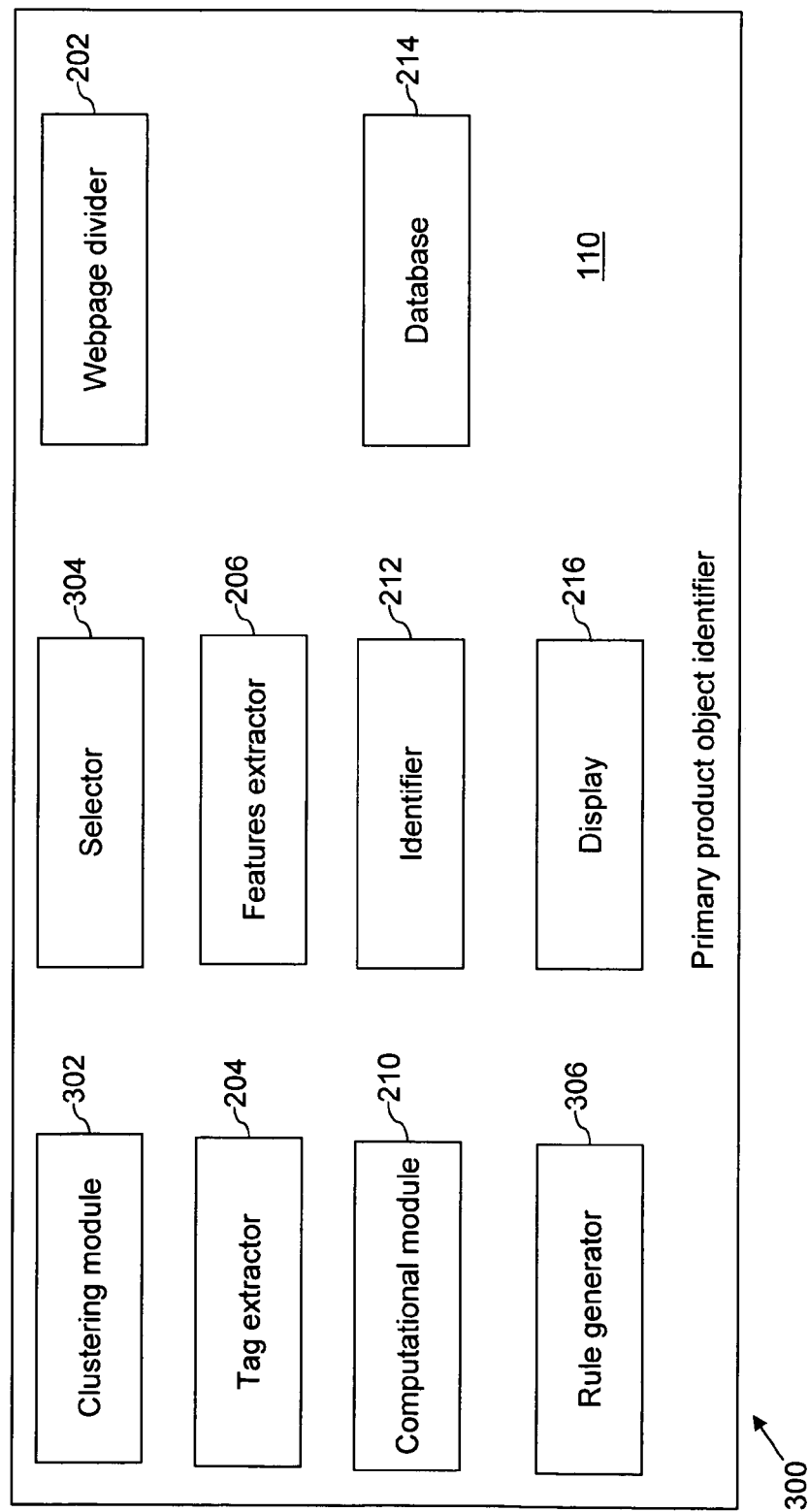
FIG. 3 is a block diagram illustrating a primary product object identifier, in accordance with another embodiment of the present invention.

FIG. 3 is a block diagram 300 illustrating the primary product object identifier 110, in accordance with another embodiment of the present invention. The primary product object identifier 110 is software or a hardware module which further includes a clustering module 302, a selector 304, and a rule generator 306. In various embodiments of the invention, a processor is configured to perform the functions of the primary product identifier 110

The clustering module 302 clusters the one or more webpages into one or more sets of webpages. Herein, the one or more webpages are related to a website such as a company's website. Webpages of the website are clustered into the sets based on the similarities in the structure and features of the webpages. In an embodiment of the present invention, the clustering module 302 clusters the one or more webpages into the one or more sets of webpages based on the URL patterns of the one or more webpages in the website. This can be done based on various features of the URL like subdomains, directories, or url parameters. For example, the product webpages of a website represented, for example, by the URL prefix www.xyz.com/product/ can be clustered into one set, corporate webpages of the website represented, for example, by the URL prefix www.xyz.com/corporate/ can be clustered into another set and product category webpages of the website such as www.xyz.com/category/ can be clustered into another set. Similarly, a product identification (productid) webpages of a website, such as http://www.xyz.com?productid=65789, category identification (categoryid) webpages of the website, such as http://www.xyz.com?category=5, and corporate webpages of the website such as http://www.xya.com/aboutus.html may also be clustered by the clustering module 302.

In another embodiment of the present invention, hierarchical structure and meta information of the one or more webpages is analyzed by using tree alignment techniques. Based on this analysis, the one or more webpages having similar properties can be clustered by the clustering module 302.

Upon clustering, the selector 304 selects a few webpages from each set or cluster based on a predefined rule. For example, the number of webpages that may be selected from a set is based on a random number that is generated by the system hardware. In another embodiment of the present invention, the one or more webpages are selected based on marking of the one or more webpages by a user. Primary product objects are identified in the selected webpages in each set of webpages by primary product identifier 110 as described in FIG. 2. Herein, if the selected webpages have more than one primary product objects, webpage divider 202 divides the webpage into sections and primary product objects are identified for each section.

Figure 4:
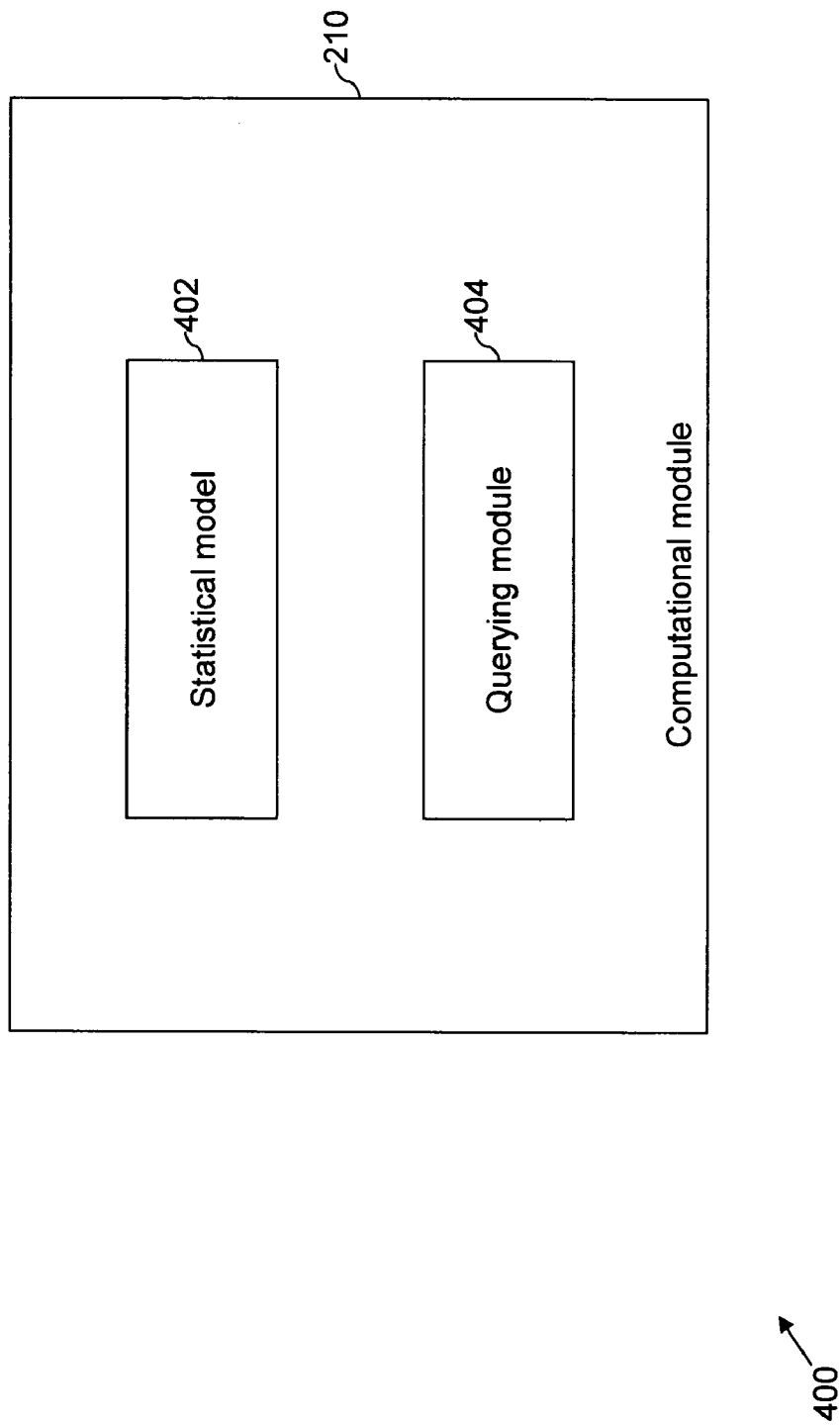
FIG. 4 is a block diagram illustrating a computational module, in accordance with an embodiment of the present invention.

The rule generator 306 generates a rule for identifying primary product objects in webpages within the sets of webpages based on the analysis of the selected webpages from each set. The rule can be based on for example, the position of the primary product objects on the selected webpages. In an embodiment of the invention, the rule may be generalized to include webpages with variation in properties. In an example, the generated rule can be in the form of an XPath Expression. The identifier 212 applies the generated rule to webpages other than the selected webpages within the set of webpages. The generation and execution of the rule on the remaining webpages in each set helps in optimal utilization of computational resources as probability computation and extraction of all candidate product objects on each webpage is not required FIG. 4 is a block diagram 400 illustrating the computational module 210, in accordance with an embodiment of the present invention. The computational module 210 includes a statistical model 402 and a querying module 404. In alternate embodiments of the invention, statistical model 402 may be implemented as a Linear model, a Naïve Bayes model, a J48 Decision Tree, a k-Nearest Neighbors (KNN) model, a Support Vector Machine (SVM) and the like. In an embodiment of the invention, statistical model 402 may be generated based on one or more sets of sampled data. The one or more sets of sampled data may be built and tabulated by human training. The computational module 210 computes a probability of candidate product objects in each of one or more webpages being primary product objects by querying the statistical model 402. The querying module 404 queries the statistical model 402 based on a set of features extracted by the features extractor 206.

The statistical model 402 is built based on user input. Herein the users are a set of individuals whose inputs are used to develop and train a statistical model. It should be apparent to those skilled in the art that these are different from users of the search engine 106. These users are referred to as trainers. In an embodiment of the present invention, a custom browser module may be used with necessary server-side support, to present the one or more webpages to a trainer. In an embodiment of the present invention, the custom browser module may be implemented using Firefox®. The trainer selects candidate product objects in the one or more webpages as primary product objects by hovering over and clicking the candidate product objects by a pointing device, such as a computer mouse. Trainer selects an object based on his/her understanding and the view of the webpage. The candidate product objects selected by the trainer are labeled as primary product objects, and all the other objects on the webpage are labeled as non-product objects. If the trainer does not select a product object as a primary product object, the candidate product objects on the webpage are labeled as non-product objects. Thereafter, a set of features, for example, style attribute features, link text features, alternative text features, proximity features, aspect ratio features, geometric features, file and hosting features, or a combination thereof, is extracted for the candidate product objects on the webpages. These features are tabulated as sets of sampled data. Sets of sampled data are prepared based on the extracted set of features. The sets of sampled data are then tabulated. Thereafter, the statistical model 402 is trained to compute the probability that a product object is the primary product object, based on the extracted set of features of the product object. In an embodiment of the present invention, the statistical model 402 may be trained as a Bayesian network. Structure learning on the Bayesian network may be carried out by using structure learning methods such as Hill Climbing with Random Restart, Simulated Annealing, K2, and the like. The Bayesian score criterion is used to evaluate quality of the statistical model 402. Further, the statistical model 402 is iteratively modeled and updated with respect to the Bayesian score criterion by making incremental changes to the statistical model 402. This confirms the statistical model 402 to the tabulated sets of sampled data. In an embodiment of the present invention, the statistical model 402 may be updated in real-time. For example, when a user purchases a product as a result of a search, the set of features may be extracted from the primary product object and the extracted set of features may be tabulated along with product-related information to update the statistical model 402. It will be apparent to those skilled in the art that the trainer usually analyses a few hundred webpages based on which the statistical model is built. This model is then used for identifying primary product objects from all webpages available on the Internet.

An exemplary statistical model trained as a Bayesian network for identifying primary product images can be described as follows:

A total of 539 webpages are displayed to a trainer. The trainer selects primary product image objects by hovering over and clicking image objects of the one or more candidate product objects on each of the 539 webpages. This results in tagging of 39,422 image objects. The tagged image objects include primary product image objects and non-product image objects. Thereafter, a set of features for each of the 39,422 image objects is extracted. Subsequently, the set of features are tabulated. A database is modeled as a Bayesian network. Structure learning on the Bayesian network is carried out using one of a Hill Climbing with Random Restart method, a Simulated Annealing method, a K2 method, and the like. The Bayesian score criterion is used to evaluate quality of the statistical model. The statistical model is updated iteratively, with an accuracy of 99.2441% and a root mean square error of 0.0802%. The statistical model identifies 38,587 non-product image objects out of 38,667 tagged image objects. Further, 581 primary product image objects are identified by the statistical model out of 755 primary product image objects selected by the trainer.

Figure 5:
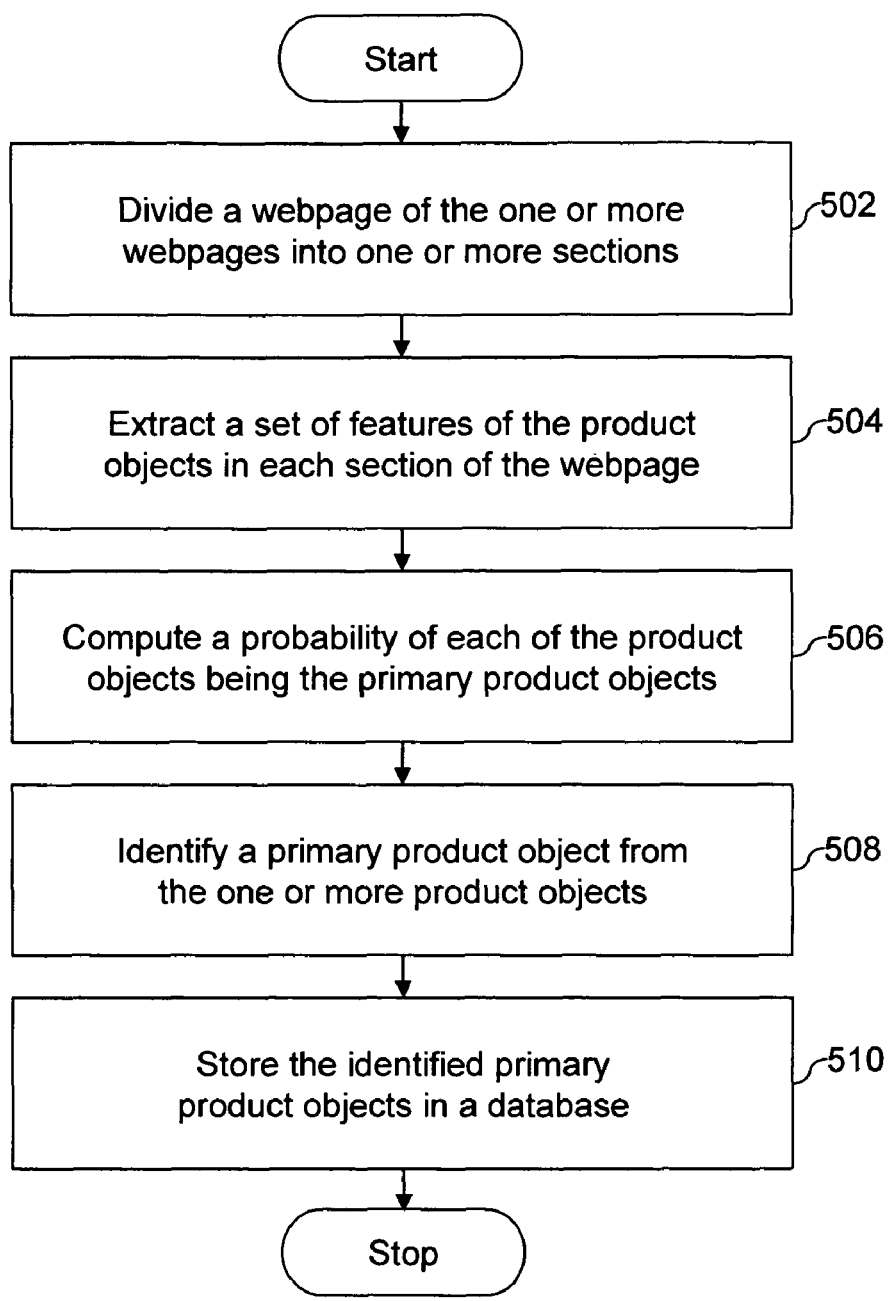
FIG. 5 illustrates a flow diagram of a method for identifying one or more primary product objects in one or more webpages over the Internet, in accordance with an embodiment of the present invention.

FIG. 5 illustrates a flow diagram of a method for identifying one or more primary product objects in one or more webpages over the Internet 104, in accordance with an embodiment of the present invention. At step 502, the webpage divider 202 divides each of the one or more webpages into one or more sections. Each section includes one or more candidate product objects. At least one of the candidate product objects in each section is a primary product object. Thereafter, at step 504, the features extractor 206 extracts a set of features of the candidate product objects in each section of each webpage. The set of features include style attribute features, alternative (ALT) text features, link text features, proximity features and aspect ratio features.

At step 506, the computational module 210 computes a probability of each product object in each section of each webpage being a primary product object. The probabilities are computed based on the extracted set of features. This has been explained in detail in conjunction with FIGS. 2 and 3. The probabilities indicate a likelihood of the candidate product objects in each section being the primary product objects. Thereafter, at step 508, the identifier 212 identifies one or more primary product objects from the candidate product objects in each section of each webpage. The primary product objects are identified based on the computed probabilities for each product object in each section of each webpage. Subsequently, at step 510, the database 214 stores the identified primary product objects for each section of each webpage. Finally, at step 512, the display 216 displays the primary product objects in response to a user query. It will be apparent to those skilled in the art that steps 502-510 are executed independent of a user query. These steps are performed for each webpage available over the Internet. At step 512, when a user is searching for a product, the already identified primary product objects from the database are thereafter retrieved and searched to provide the best possible results to the user. Thus each webpage is transformed/tagged using the identification of primary product objects on them, stored, and retrieved thereafter This enables online product searching.

Figure 6A:
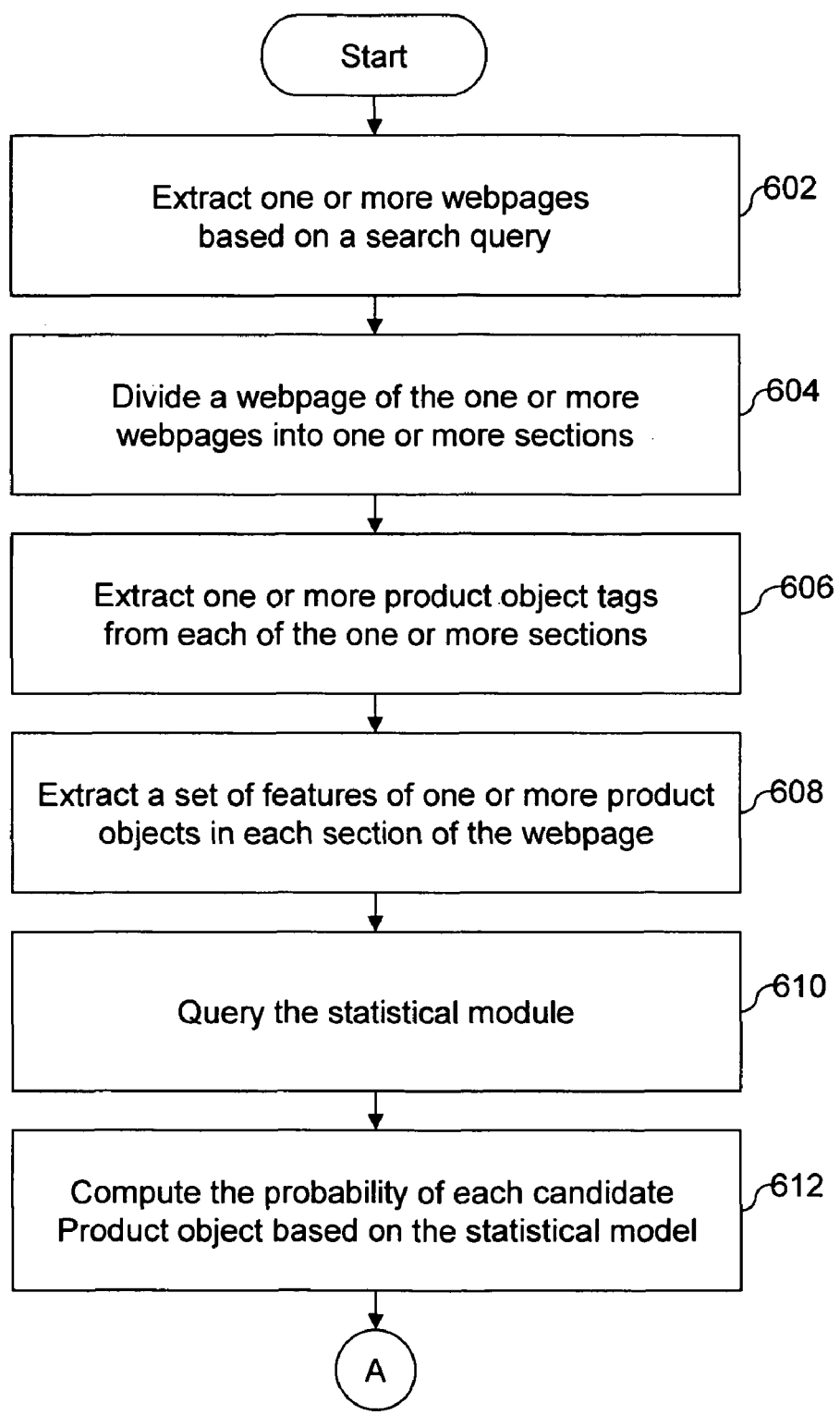
FIGS. 6A and 6B illustrate a detailed flow diagram of a method for identifying one or more primary product objects in one or more webpages over the Internet, in accordance with an embodiment of the present invention.
Figure 6B:
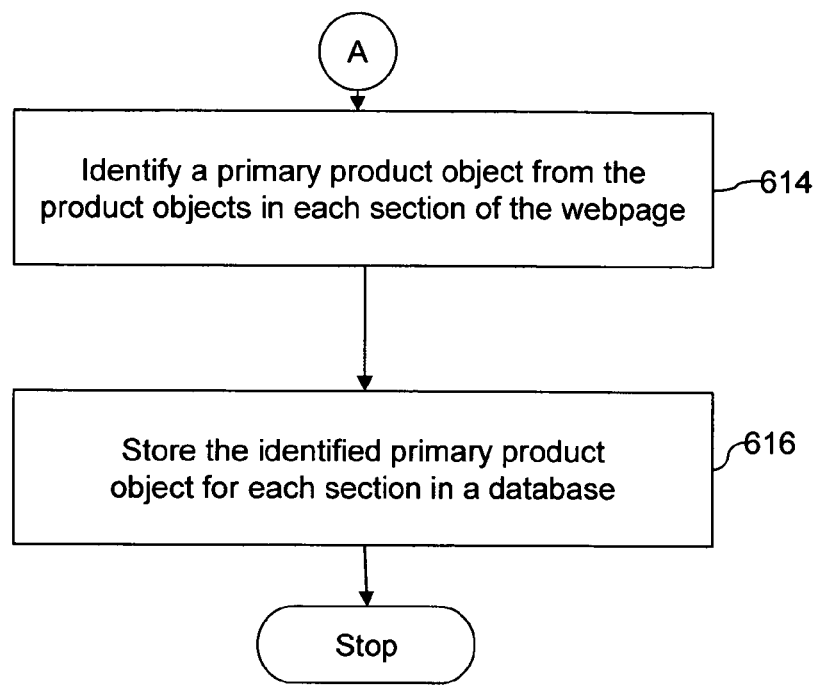

FIGS. 6A and 6B illustrate a detailed flow diagram of a method for identifying one or more primary product objects in one or more webpages over the Internet 104, in accordance with an embodiment of the present invention. At step 602, the webpage extractor 108 extracts one or more webpages from the Internet 104. For example, a web crawler crawls the webpages available over the Internet 104. It is checked if each webpage has multiple primary product objects. Accordingly, at step 604, the webpage divider 202 divides each of the extracted webpages into one or more sections. Each of the one or more sections includes one or more candidate product objects. At least one of the one or more candidate product objects in each section is a primary product object. Subsequently, at step 606, the tag extractor 204 extracts tags of each of the one or more candidate product objects in each section of each webpage. In an embodiment of the present invention, the tag extractor 204 extracts Hypertext Markup Language (HTML) tags from each section of each webpage.

At step 608, the features extractor 206 extracts a set of features of the candidate product objects in each section of each webpage. The set of features includes style attribute features, alternative (ALT) text features, link text features, proximity features, aspect ratio features, geometric features, file and hosting features, or a combination thereof. Herein, a comparison is performed between the features of each candidate product objects for example, proximity of a product object to elements such as zoom button, 'add to cart' button is calculated to identify the primary product objects. Similarly features such as ALT text of a product object is analyzed, for example, if ALT text of an image object is present as text in the webpage then probability of the image object being the primary product object is higher.

At step 610, the querying module 404 queries the statistical model 402. The statistical model 402 may be one of a Bayesian network, a Linear model, a Naïve Bayes model, a J48 decision tree, a k-Nearest neighbors model and a Support vector machine. The statistical model 402 is built based on data samples collected from users searching for a product on the Internet 104 using search engine 106. Subsequently, at step 612, the computational module 210 computes a probability of the candidate product objects in each section of each webpage being a primary product object based on the statistical model 402. The computed probability is also based on the extracted set of features. The probability indicates a likelihood of the primary product objects in each section of each webpage being the primary product objects.

At step 614, the identifier 212 identifies one or more primary product objects from the candidate product objects in each section of each webpage, based on the computed probabilities of the candidate product objects. Further, at step 616, the database 214 stores the identified primary product objects for each section of each webpage.

Figure 7A:
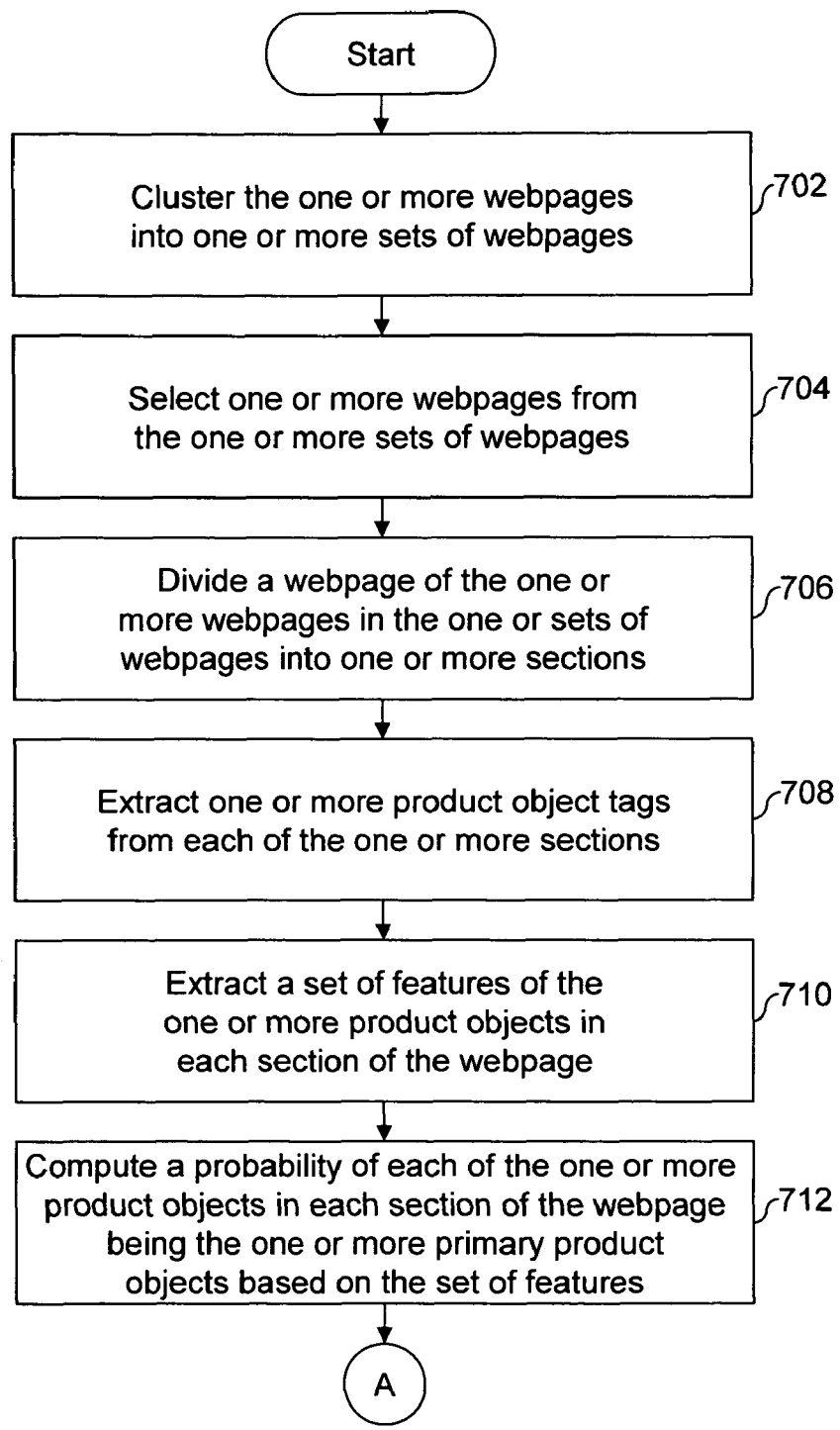
FIGS. 7A and 7B illustrate a flow diagram of a method for identifying one or more primary product objects in one or more webpages over the Internet, in accordance with another embodiment of the present invention.
Figure 7B:
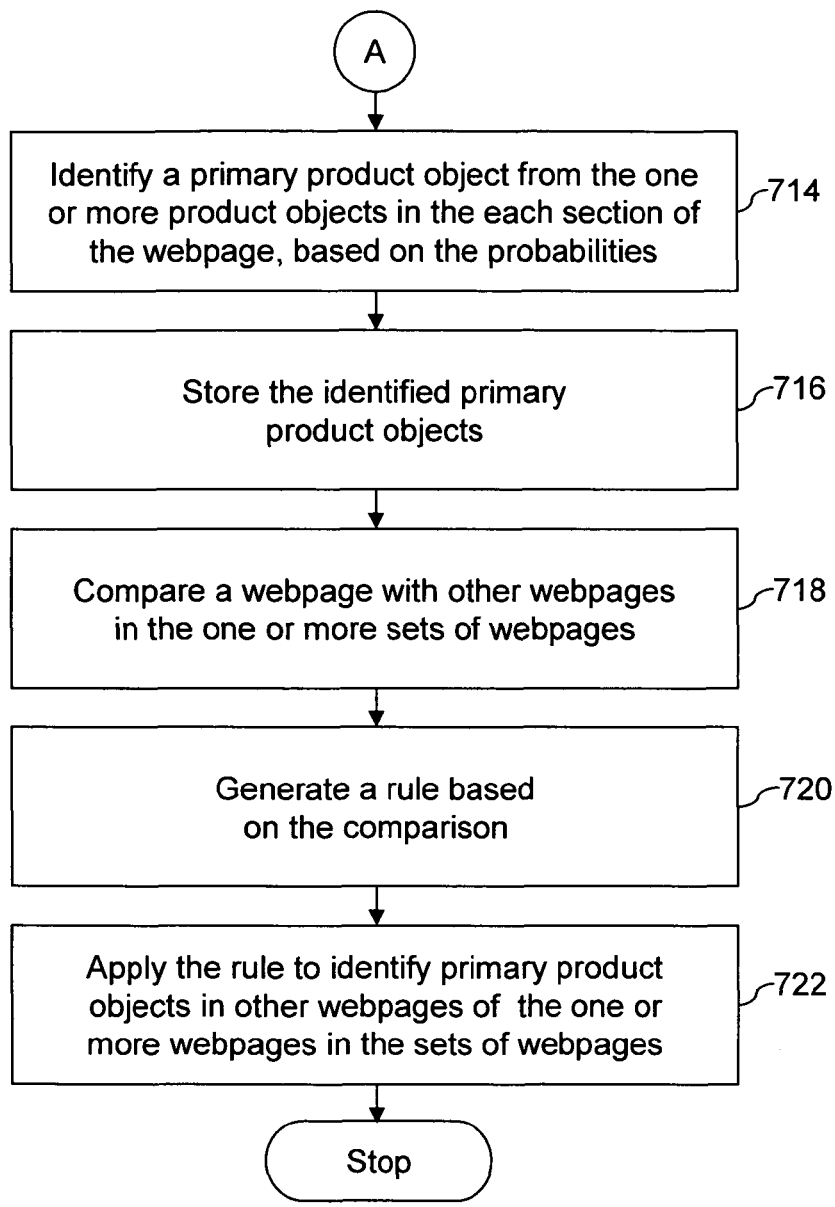

FIGS. 7A and 7B illustrate a flow diagram of a method for identifying one or more primary product objects in one or more webpages over the Internet 104, in accordance with another embodiment of the present invention. At step 702, the clustering module 302 clusters the one or more webpages into one or more sets of webpages. The one or more sets of webpages refer to webpages in a website of the Internet 104. The website is hosted on a web server. The webpages of the website are located in a directory of the web server and can be accessed by using Uniform Resource Locator (URL). Thereafter, at step 704, the selector 304 selects one or more webpages from the one or more sets of webpages based on a predefined rule. In an embodiment of the present invention, the predefined rule includes random selection of the one or more webpages from the one or more sets of webpages. In another embodiment of the present invention, the one or more webpages are selected based on marking of the one or more webpages by a user. The primary product objects are identified in the selected webpages.

At step 706, the webpage divider 202 divides each of the one or more webpages in each of the one or more sets of webpages into one or more sections. Thereafter, at step 708, the tag extractor 204 extracts product object tags from each section of each webpage in the sets of webpages. In an embodiment of the present invention, the tag extractor 204 extracts Hypertext Markup Language (HTML) tags from each section of each webpage. Subsequently, at step 710, the features extractor 206 extracts a set of features of the candidate product objects in each section of each of the one or more webpages. The set of features include style attribute features, alternative (ALT) text features, link text features, proximity features, aspect ratio features, geometric features, file and hosting features, or a combination thereof.

At step 712, the computational module 210 computes a probability of each product object in each section of each webpage, being a primary product object. The probability is computed based on the extracted set of features. The probability indicates a likelihood of the candidate product objects in each section of each webpage being the primary product objects. Thereafter, at step 714, the identifier 212 identifies one or more primary product objects from the candidate product objects in each section of each webpage, based on the computed probabilities. Further, at step 716, the database 214 stores the identified primary product objects for each section of each webpage.

At step 718, the comparator 208 compares a webpage of the one or more webpages with other webpages of the one or more webpages in the one or more sets of webpages. Subsequently, at step 720, the rule generator 306 generates a rule for identifying one or more primary product objects in the other webpages within each of the one or more sets of webpages, based on the comparison in the step 718. Further, at step 722, the identifier 212 applies the generated rule to the other webpages in each of the sets of webpages to identify primary product objects from the other webpages. The primary product objects are then stored in the database 214.

Identifying primary product objects on webpages makes online shopping a convenient and time-efficient process. Further, a faster way of finding products online is enabled. Moreover, higher sales are ensured for merchant websites on the Internet since primary product objects determine purchase to a great extent. The identification of primary product objects is efficient and computationally less intensive. This helps in improving the performance of the method for identifying the primary product objects.

The method for identifying primary product objects on one or more webpages over the Internet, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a processor which may be in the form of a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program stored on computer readable media. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for identifying a plurality of primary product objects in each of one or more webpages over the Internet, the method comprising the steps of:
   a. dividing a webpage into one or more sections based on the relative positions of candidate product objects on the webpage, each section having at least one product object candidate for being a primary product object;
   b. extracting a set of features of the at least one product object in each of the one or more sections of the webpage, the set of features including at least one of style attribute features, link text features, alternative text features, proximity features and aspect ratio features;
   c. computing a probability of each of the at least one candidate product objects in each section of the webpage being a primary product object based on the set of features, the probability indicating a likelihood of the at least one product object being the primary product object;
   d. identifying the primary product object from the candidate product objects in the each section of the webpage based on the probabilities, wherein the identified primary product object for the each section is stored; and
   wherein the stored primary product object for each section enabling online searching of a product and the steps being performed by a processor in communication with a storage device.

2. The method of claim 1, wherein the set of features further comprises at least one of geometric features, file features and file hosting features.

3. The method of claim 1, wherein the at least one candidate product objects comprise one or more image objects and one or more title objects.

4. The method of claim 3, wherein identifying the primary product object and computing the probability of the one or more candidate product objects being the one or more primary product objects further comprises the step of comparing the alternative text features of the one or more image objects with the one or more title objects for the candidate product objects in each section of the webpage.

5. The method of claim 3, wherein identifying the primary product object further comprises the step of comparing the style attribute features of an image object of the one or more image objects in the each section of the webpage with the style attribute features of other image objects of the one or more image objects in the each section of the webpage.

6. The method of claim 1, wherein computing the probability further comprises the step of estimating a ranking of the one or more candidate product objects based on a comparison of the alternative text features of the each product object in the each section of the webpage with the link text features of the each product object in the each section of the webpage.

7. The method of claim 1, wherein extracting the proximity features comprises the step of identifying proximity between the each product object on the webpage and one or more elements of the webpage, the one or more elements including at least one of a zoom button, a color swatch and a shop button.

8. The method of claim 1, wherein the probability of the each of the one or more candidate product objects being the one or more primary product objects is computed based on a statistical model.

9. The method of claim 8, wherein the statistical model comprises at least one of a Bayesian network, a Linear model, a Naïve Bayes model, a J48 Decision Tree, a k-Nearest Neighbors model and a Support Vector Machine.

10. The method of claim 9, further comprising the step of building the statistical model based on sampled data.

11. A method for identifying one or more primary product objects in each of one or more webpages over the Internet, the method comprising the steps of:
  a. clustering the one or more webpages into at least one set of webpages based on the structure and features of the one or more webpages, the at least one set of webpages being associated with a website on the Internet;
  b. selecting one or more webpages from the at least one set of webpages based on a predefined rule;
  c. dividing a webpage of the one or more webpages in the at least one set of webpages into one or more sections, each of the one or more sections comprising the one or more candidate product objects, each section having at least one product object candidate for being a primary product object;
  d. extracting a set of features of the one or more candidate product objects in each section of the webpage, the set of features comprising at least one of style attribute features, link text features, alternative text features, proximity features and aspect ratio features;
  e. computing a probability of each of the one or more candidate product objects in the each section of the webpage being the one or more primary product objects based on the set of features, the probability indicating a likelihood of the one or more candidate product objects being the one or more primary product objects;
  f. identifying a primary product object from the one or more candidate product objects in the each section of the webpage, based on the probabilities, wherein the identified one or more primary product object for the each section is stored;
  g. generating a rule based on a comparison of a webpage of the one or more webpages in the one or more sets of webpages with other webpages of the one or more webpages in the one or more sets of webpages;
  h. applying the generated rule for identifying the one or more primary product objects in the other webpages of the one or more webpages in the one or more sets of webpages; and
  i. storing the primary product objects from each of the one or more sections to enable online searching for a product.

12. The method of claim 11, wherein generating the rule comprises the step of identifying the one or more primary product object in the each of the other webpages of the one or more webpages in the one or more sets of webpages.

13. The method of claim 11, wherein the set of features further comprises at least one of geometric features, file features and file hosting features.

14. The method of claim 11, wherein the one or more candidate product objects comprise one or more image objects and one or more title objects.

15. The method of claim 14, wherein identifying the primary product object and computing the probability of the one or more candidate product objects being the one or more primary product objects further comprises the step of comparing the alternative text features of the one or more image objects with the one or more title objects for the one or more candidate product objects in the each section of the webpage.

16. The method of claim 14, wherein identifying the primary product object further comprises the step of comparing the style attribute features of an image object of the one or more image objects in the each section of the webpage with the style attribute features of other image objects of the one or more image objects in the each section of the webpage.

17. The method of claim 14, wherein selecting the one or more webpages from the one or more sets of webpages comprises the step of identifying an hierarchical structure of each of the one or more webpages and analyzing meta information of each of the one or more webpages.

18. The method of claim 11, wherein computing the probability further comprises the step of estimating a ranking of the one or more candidate product objects based on a comparison of the alternative text features of the each product object in the each section of the webpage with the link text features of the each product object in the each section of the webpage.

19. The method of claim 11, wherein extracting the proximity features comprises the step of estimating a distance between the each product object on the webpage and each of one or more elements of the webpage, the one or more elements comprising at least one of a zoom button, a color swatch and a shop button.

20. The method of claim 11, wherein the probability of the each of the one or more candidate product objects being the one or more primary product objects is computed based on a statistical model.

21. The method of claim 20, wherein the statistical model comprises at least one of a Bayesian network, a Linear model, a Naïve Bayes model, a J48 Decision Tree, a k-Nearest Neighbors model and a Support Vector Machine.

22. The method of claim 21, further comprising the step of building the statistical model based on sampled data.

23. A computer program product for use with a stored program computer, the computer program product comprising a computer usable medium having a computer readable program code embodied therein for identifying one or more primary product objects in each of one or more webpages over the Internet, the computer readable program code performing:
  a. clustering the one or more webpages into at least one set of webpages based on the structure and features of the one or more webpages, the at least one set of webpages being associated with a website on the Internet;
  b. selecting one or more webpages from the at least one set of webpages based on a predefined rule;
  c. dividing a webpage of the one or more webpages in the at least one set of webpages into one or more sections, each of the one or more sections comprising the one or more candidate product objects, each section having at least one product object candidate for being a primary product object;
  d. extracting a set of features of the one or more candidate product objects in each section of the webpage, the set of features comprising at least one of style attribute features, link text features, alternative text features, proximity features and aspect ratio features;

e. computing a probability of each of the one or more candidate product objects in the each section of the webpage being the one or more primary product objects based on the set of features, the probability indicating a likelihood of the one or more candidate product objects being the one or more primary product objects;

f. identifying a primary product object from the one or more candidate product objects in the each section of the webpage, based on the probabilities, wherein the identified one or more primary product object for the each section is stored;

g. generating a rule based on a comparison of a webpage of the one or more webpages in the one or more sets of webpages with other webpages of the one or more webpages in the one or more sets of webpages;

h. applying the generated rule for identifying the one or more primary product objects in the other webpages of the one or more webpages in the one or more sets of webpages; and i. storing the primary product objects from each of the one or more sections to enable online searching for a product.

24. A computer program product for use with a stored program computer, the computer program product comprising a computer usable medium having a computer readable program code embodied therein for identifying one or more primary product objects in each of one or more webpages over the Internet, the computer readable program code performing:

a. dividing a webpage into one or more sections based on the relative positions of candidate product objects on the webpage, each section having at least one product object candidate for being a primary product object;

b. extracting a set of features of the at least one product object in each of the one or more sections of the webpage, the set of features including at least one of style attribute features, link text features, alternative text features, proximity features and aspect ratio features;

c. computing a probability of each of the at least one candidate product objects in each section of the webpage being a primary product object based on the set of features, the probability indicating a likelihood of the at least one product object being the primary product object; and d. identifying the primary product object from the candidate product objects in the each section of the webpage based on the probabilities, wherein the identified primary product object for the each section is stored.

* * * * *